INVENTORS
JAMES V. CARTMELL &
DONALD CHURCHILL

BY E. Frank McKinney
Patrick P. Pacella

THEIR ATTORNEYS

United States Patent Office 3,674,338
Patented July 4, 1972

3,674,338
REAR PROJECTION SCREEN EMPLOYING LIQUID CRYSTALS
James V. Cartmell, Dayton, and Donald Churchill, Kettering, Ohio, assignors to The National Cash Register Company, Dayton, Ohio
Filed Aug. 5, 1970, Ser. No. 61,131
Int. Cl. G03b 21/56
U.S. Cl. 350—117                                    9 Claims

ABSTRACT OF THE DISCLOSURE

A rear projection screen is disclosed wherein organic nematic mesomorphic compounds, i.e., liquid crystals, are employed. The liquid crystals have a threshold electric field which when exceeded causes the liquid crystals to scatter light. A thin film of the liquid crystal in the light scattering mode can be used for a screen in a rear projection system.

---

Figure 1:
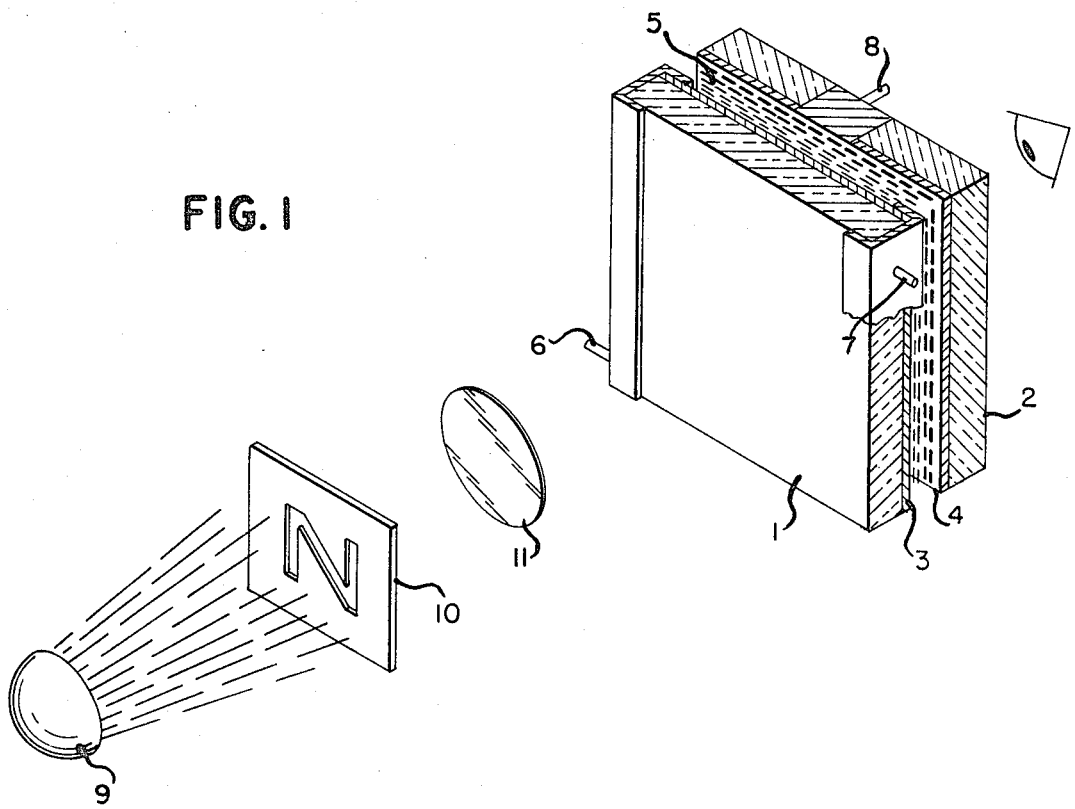

This invention relates to display devices known as transmission or rear projection systems.

Rear projection systems generally comprise a projector and screen, the screen being between the projector and viewer. The projector usually comprises a light source, image and lens, the image being between the light source and lens.

By using a rear projection or transmission screen, the image, i.e., an object or film, is projected onto the screen. Often, rear projection screens are made of ground glass. A more recent type is made up of a multitude of tiny lenses imbedded in a plastic.

The primary optical characteristics of a rear projection screen are distribution, gain and resolution. Distribution is a measure of the light spreading character of a rear projection screen. Distribution is given as a plot which shows the intensity of a ray of light at the different angles to which the light is scattered. Screen gain is the ratio of the intensity of transmitted light normal to the screen to the intensity of light scattered from a perfect diffuser such as a magnesium carbonate block. Screen resolution is the ability of a screen surface to deliver fine image detail. Resolution usually is measured in lines per inch or lines per millimeter.

The quality of a rear projection system is determined by several parameters which are described in relation to the user reaction. Several of these parameters are dependent upon the properties of the screen itself either in conjunction with or independent from the rest of the system. Screen fall-off refers to a decrease in the screen brightness at positions to the sides of the screen center. This arises from a combination of non uniformity of the projection system and poor distribution of the light scattered by the screen. Screen resolution relates to the detail visible on the screen independent of the resolution to the projection system. Screen breakthrough is manifested by a bright spot in the screen due to light which is not diffused. Another effect which is not as easily defined but contributes greatly to eye fatigue is sparkle. This is the occurrence of multitudes of tiny bright spots in a light area of the image which seem to dance or scintillate. This is particularly troublesome for users who must observe a screen for long periods of time, e.g., parts catalogues recently have been put on film and are viewed on screens for periods of time ranging up to 8 hours a day. Also, instructional speed reading devices employing rear projection screens often are viewed by students for periods of time ranging up to 2 hours. In one commercially available rear projection screen sparkle is eliminated by employing two screens separated by a few mils. One of the screens is kept in constant motion relative to the other by a motor driven mechanism. This rather elaborate system is effective in reducing sparkle but adds considerable expense to the system.

It now has been found that organic nematic mesomorphic compounds, hereinafter referred to as liquid crystals, can be employed in rear projection screens. The screen comprises two substrates having adjacent parallel surfaces less than 500 microns apart, preferably less than 150 microns apart. The adjacent surfaces of each substrate are coated with a transparent electrically conductive film and the space between the adjacent surfaces of the two substrates is filled with liquid crystals. By passing focused light rays from a projector to the screen, an image is projected onto the screen. When the electric field between the substrates is zero, the light rays transmitted through the device are in the same direction as the incident light rays. When the electric field between the two substrates is increased until a certain threshold value is reached, there is a sudden change in the optical properties between the two substrates. This change in optical properties is manifested as a scattering of the transmitted light in all directions. The observer now sees the image focused onto the screen. The distribution of the light scattered from the liquid crystal can be varied by adjustment of the voltage above the threshold value.

With the use of rear projection screens employing liquid crystals, it has been found that sparkle has been essentially eliminated from rear projection systems. Furthermore, screen fall-off is much improved over standard screens.

The liquid crystals that can be employed in this invention are described in column 1, line 55, to column 4, line 65 of the U.S. Pat. 3,322,485. Other liquid crystals that can be employed in the screen of this invention are: methoxy benzylidene p-n butylaniline, ethoxy benzylidene p-n butylaniline, bis(4' - n - octyloxybenzol)-2-chloro - 1,4 - phenylenediamine, or butyl p-(p-ethoxy-penoxycarbonyl)-phenyl carbonate. Mixtures of these compounds also can be employed in this invention, e.g., a mixture of 75 weight percent ethoxy benzylidene p-n butylaniline and 25 weight percent bis(4'-n-octyloxybenzol) - 2 - chloro-1,4-phenylenediamine. Since the density of scattering centers is dependent on the flow of ions through the liquid crystal medium it has been found that the addition of easily ionized materials often improves the scattering properties. For example, the addition of up to 1.0 weight percent octoic acid to a liquid crystal, e.g., methoxy benzylidene p-n butylaniline which is a liquid crystal from 10° to 47° C., yields a marked improvement in the light scattering characteristics of the liquid crystal. Other ions can be used for this effect.

A variety of transparent solids are employed for the substrates of this invention. Specific examples are glass, fused quartz, transparent corundum, plastics or resins. The inner faces of the substrates are coated with a thin layer of indium oxide or tin oxide. The screen of this invention is maintained at a temperature in which the compound exhibits the nematic mesophase, i.e., a liquid crystal state. This can be at room temperature or higher depending upon the liquid crystal material employed. Heating can be carried out by any conventional method, if needed. Specifically, a buss bar heater is described in the following example.

Previously, the observer viewed the display device within a small angle from the direction normal to the rear projection screen. Due to the improved fall-off, the observer can view the display device at wide angles with a high degree of acuity.

The rear projection screen of this invention is described in greater detail in connection with the accompanying drawing, in which the figure is a sectional view of a rear projection system embodying this invention.

It has been found that the screens of this invention require low voltage and very little power. Generally, the voltage requirement ranges from 10 to 300 volts, preferably 10 to 100 volts. The rear projection system of this invention can employ either D.C. current or A.C. current. A.C. current is preferred because it is more readily available, i.e., elaborate voltage supplies are not needed as the device merely can be plugged into any wall outlet. Also, the materials have a finite life expectancy which is extended when A.C. current is used.

Having disclosed, generally, the rear projection screen of this invention, an example now is disclosed further illustrating the rear projection screen.

EXAMPLE

In the system of this example, substrates 1 and 2 are transparent glass plates measured 4" x 4". The substrates 1 and 2 are aligned so that their adjacent faces 3 and 4 are parallel and spaced about 50 microns apart. The faces 3 and 4 were coated with a thin layer of tin oxide. The substrates 1 and 2 can be positioned apart by means of shims or the spacing can be maintained by means of clamps or a frame-like holder. The space 5 between the two substrates is filled with a liquid crystal. In this example, a 50/50 blend of butyl p-(p-ethoxypenoxycarbonyl)-phenyl carbonate and butyl p-ethylphenyl terephthalate was employed. Note, the screen is sealed at both ends (not shown) in order to retain the liquid crystal in space 5. Electrical lead wires 6 and 7 are attached to substrate 1 as is electrical lead wire 8 attached to substrate 2. This can be done by conventional techniques such as by silver paint. Electric leads 6 and 7 run full length of substrate 1 and act as a buss bar heater. By applying voltage (not shown) at leads 6 and 8, the liquid crystal can be heated to its liquid crystal state if needed. In this example, the mixture was heated to 40° C. by applying 20 volts A.C. to leads 6 and 7. Leads 6 and 8 are connected to a voltage source (not shown) ranging from 10 to 300 volts. By adjusting the voltage, e.g., 10, 50 or 100 volt increments, the ratio of transmitted light to scattered light can be controlled to suit the viewer. The light rays from the light source 9 pass through the FIG. 10, which then are focused by lens 11. The projected image is focused on the liquid crystal material in space 5.

Observance of the screen of this invention demonstrates the high degree of resolution obtained by employing liquid crystals. Fine image detail is delivered by the rear projection screen of this invention as the resolution is 500 lines per inch. Observance of the screen demonstrate uniform brightness thereby indicating desirable light distribution or light spreading characteristics. Viewing the screen at wide angles demonstrates very little screen fall-off.

Not only is this rear projection screen essentially free of sparkle, but it also provides the additional advantages of adjustable gain. The ratio of transmitted light to scattered light can be varied by adjustment of the voltage to the conductive films. In this instance, the variable ratio of transmitted light to scattered light helps to adjust brightness at various angles.

Through the use of a structure of a liquid crystal cell of parallel glass plates with a liquid crystal sandwiched between them, a thin conductive coating on the inside surfaces of the plates and electrode attached to each glass plate, a rear projection screen is provided which can be viewed at various angles with a high degree of clarity and brightness without fatiguing the viewer. Further, the gain can be adjusted to suit the viewer.

What is claimed is:

1. A rear projection screen comprising:
    two spaced transparent plates;
    one face of each of said plates being coated with a transparent electrically conductive film;
    said two plates being spaced with said faces bearing said conductive films adjacent and parallel and less than 500 microns apart;
    electrically conductive leads attached to said conductive films on said two plates;
    an organic nematic mesomorphic compound filling the space between said two plates having a threshold electric field which when exceeded causes said compound to scatter light wherein said compound is at least one of methoxy benzylidene-p-n-butylamine, ethoxy benzylidene-p-n-butylamine, bis (4'-n-octyloxybenzol)-2-chloro-1,4-phenylenediamine, or butyl-p-(p-ethoxypenoxycarbonyl)-phenyl carbonate; and
    means for applying a voltage differential between said leads to establish between said conductive films on said two plates an electric field which exceeds said threshold field wherein said voltage differential ranges from 10 to 300 volts.

2. A rear projection screen according to claim 1 wherein said two plates are less than 150 microns apart and said voltage differential ranges from 10 to 100 volts.

3. A rear projection screen according to claim 1 wherein said transparent plates are glass, fused quartz, transparent corundum, plastics or resins, and said electrically conductive film is indium oxide or tin oxide.

4. A rear projection screen according to claim 1 wherein said transparent plates are glass plates, said plates are less than 50 microns apart and said electrically conductive film is tin oxide.

5. A rear projection screen according to claim 1 wherein said compound is a 50/50 mixture of butyl p-(p-ethoxyphenoxycarbonyl)-phenyl carbonate and butyl p-ethoxyphenyl terephthalate.

6. A rear projection screen according to claim 1 wherein up to 1.0 weight percent of an ion producing material is employed with said compound.

7. A rear projection screen according to claim 6 wherein said ion producing material is octoic acid.

8. A rear projection system comprising the rear projection screen of claim 1 and means for projecting a focused image onto said screen.

9. A rear projection system according to claim 8 wherein said means for projecting a focused image is a light source, an image and lens wherein said light source passes light rays first through said image and then through said lens prior to passing said focused light to said screen.

References Cited

UNITED STATES PATENTS

| | | | |
|---|---|---|---|
| 3,322,485 | 5/1967 | Williams | 23—230 LC |
| 3,319,517 | 5/1967 | Rondas | 350—117 |
| 3,576,364 | 4/1971 | Zanoni | 353—122 |

OTHER REFERENCES

Reflective Liquid Crystal Display, an article from November 1968, "Electronics World," pp. 29 and 58; Pinsky.

LOUIS R. PRINCE, Primary Examiner

D. E. CORR, Assistant Examiner